June 11, 1940.  P. E. MACK  2,203,735
HAND TRACTOR
Filed July 19, 1937   3 Sheets-Sheet 2
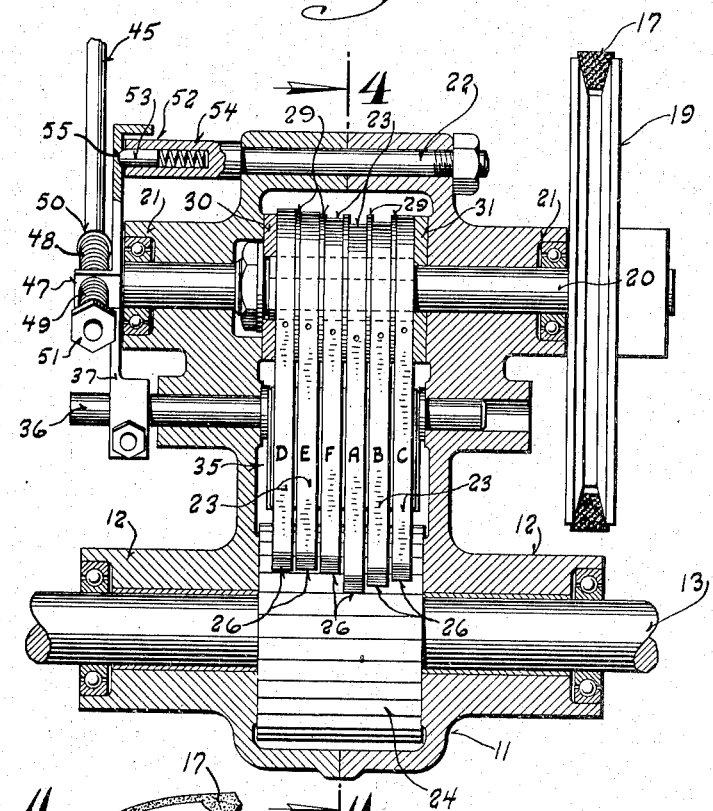
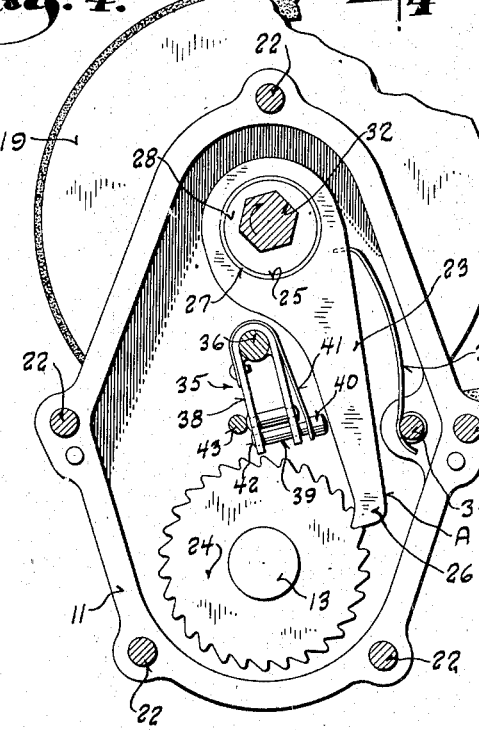
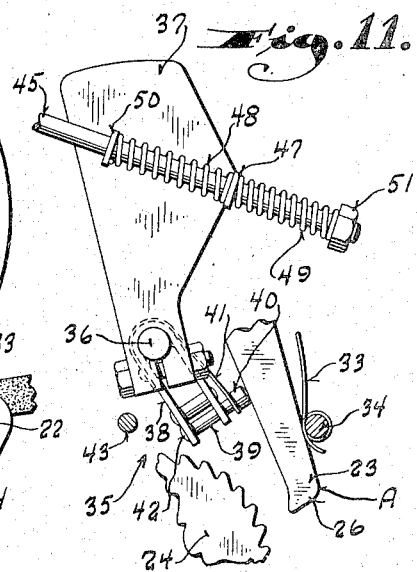
Inventor
Perry E. Mack
Attorney

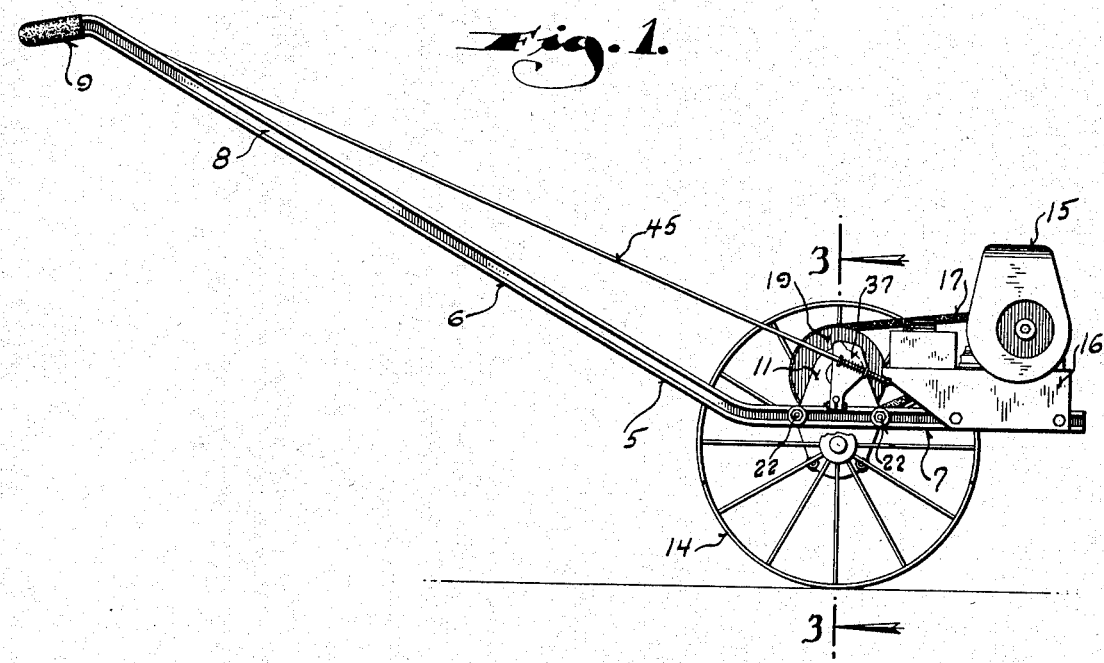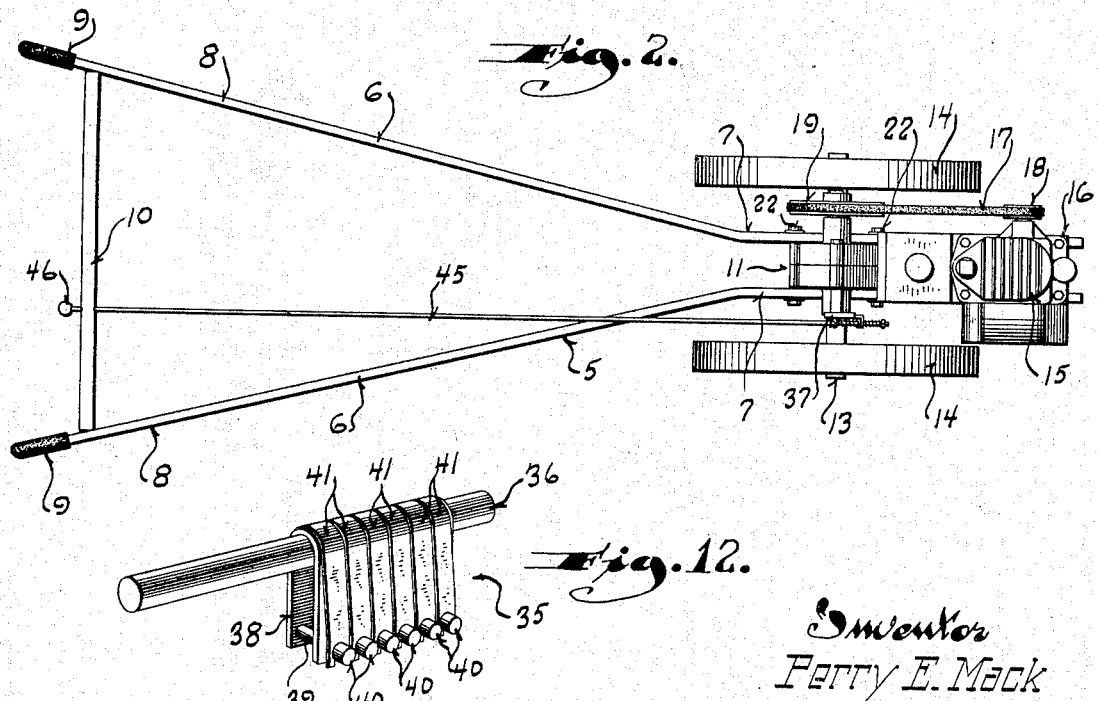

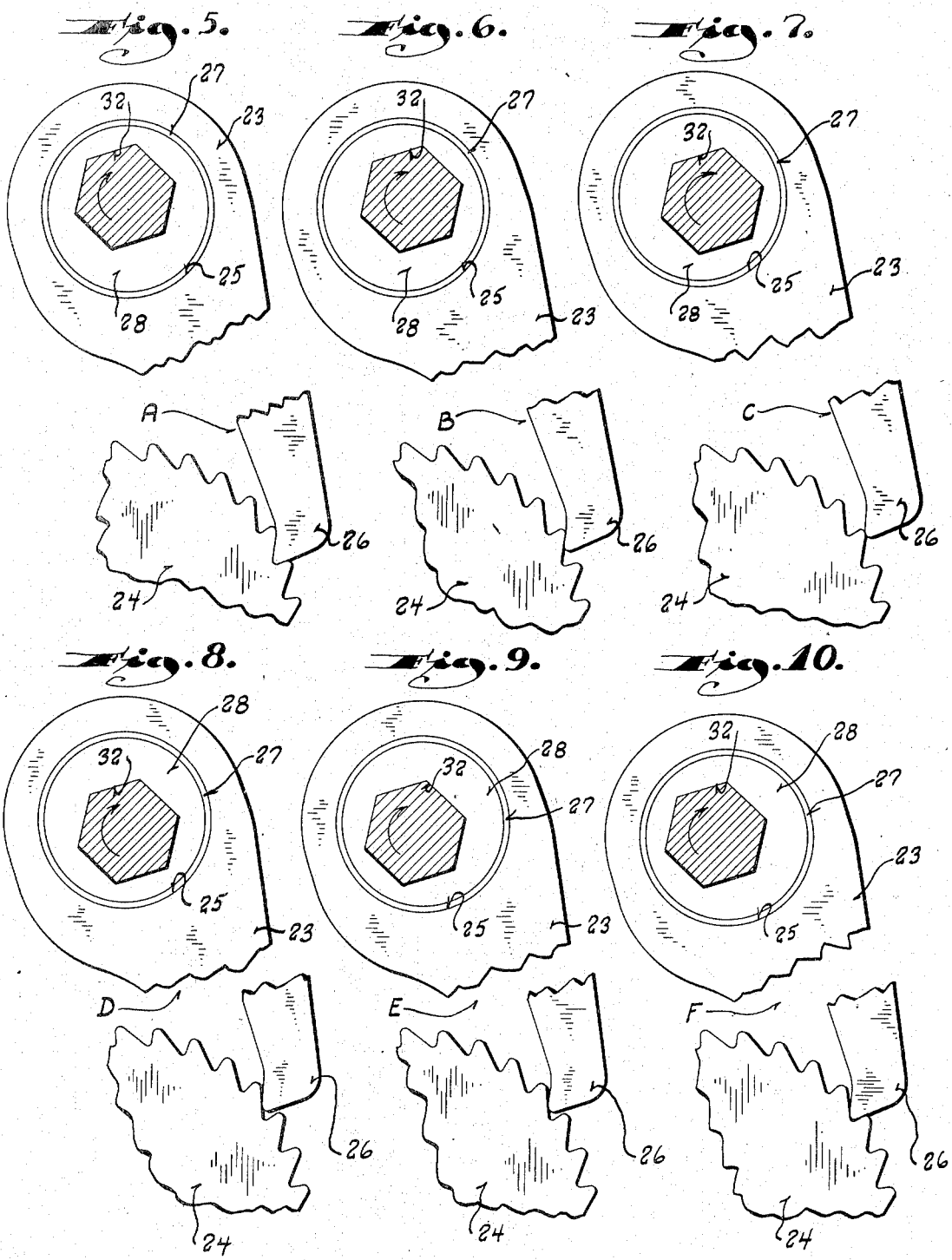

Patented June 11, 1940

2,203,735

UNITED STATES PATENT OFFICE 2,203,735

HAND TRACTOR

Perry E. Mack, Milwaukee, Wis., assignor to Briggs & Stratton Corporation, Milwaukee, Wis., a corporation of Delaware Application July 19, 1937, Serial No. 154,441

3 Claims. (Cl. 180—19)

This invention relates to tractors and refers particularly to garden tractors of the type used for cultivating small gardens.

Tractors of this type generally comprise a pair of traction wheels supporting a frame which carries a gasoline engine; the engine being drivingly connected with the wheels through a speed reduction transmission and some form of clutch. Heretofore, the necessary speed reduction has always been obtained through the conventional train of gears. Where only a small reduction in speed was required, gearing had no serious objections, but the large space and increased weight which the desired greater speed reduction entails, introduced serious objections to the conventional gear reduction.

Objection is also found in the additional cost of the clutch which had to be provided in past constructions and possibility of its slippage.

With these and other objections to past and existing tractor constructions in mind, this invention has as one of its objects to provide a light, readily portable tractor wherein the desired speed reduction is effected by an entirely new and novel transmission mechanism.

It is also an object of this invention to provide a construction wherein the function of the clutch and the transmission are combined in a unitary structure to thereby obviate the need for a clutch per se.

Another object of this invention is to provide a transmission which makes possible a large reduction in speed with a minimum space and weight requirement.

Another object of this invention is to provide an improved manner of transmitting the motive force of the engine to the traction wheels of a tractor or the like which will permit the tractor to be pushed forward at a speed faster than that at which the engine is driving it without "declutching" the engine from the traction wheels.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a tractor embodying this invention;

Figure 2 is a top plan view of the tractor;

Figure 3 is an enlarged vertical sectional view through Figure 1 on the plane of the line 3—3;

Figure 4 is a vertical sectional view through Figure 3 on the plane of the line 4—4;

Figures 5 to 10, inclusive, are detail views illustrating the manner in which the power is continuously transmitted from the engine driven shaft to the axle of the wheels;

Figure 11 is a fragmentary view to illustrate the manner in which the driving connection is controlled; and Figure 12 is a perspective view illustrating part of the control mechanism per se.

Referring now particularly to the accompanying drawings in which like numerals indicate like parts, the numeral 5 designates what may be considered the frame of the tractor. Extreme simplicity has been achieved in this respect by using the same frame elements to provide handles and also serve as an engine mount. To this end the frame consists of two elongated rails 6, either of channel cross section or any other suitable structural shape, and bent to provide horizontal portions 7, and handle portions 8.

At their outer ends the handle portions 8 are provided with grips 9, and a cross piece 10 joins the same to hold them at their proper spacing. The lower horizontal portions 7 of the rails are maintained in spaced parallel relationship by being bolted to the opposite sides of a transmission housing or casing 11. This housing or casing has bearings 12 in which an axle 13 is journalled, the ends of the axle having traction wheels 14 fixed thereto.

The horizontal portions 7 of the side rails extend forwardly beyond the transmission casing to mount an engine 15. The engine may be of any suitable type, but in the present instance is illustrated as a small portable gasoline engine mounted on a base 16, which in turn is supported on the forwardly projecting end portions 7 of the side rails.

Power is transmitted from the engine to the transmission mechanism by a belt 17 trained over an engine driven pulley 18 fastened to the crankshaft of the engine and over a pulley 19 mounted on a jack shaft 20 of the transmission mechanism. The jack shaft 20 is journalled in bearings 21 carried by the casing of the transmission mechanism and disposed substantially directly above the axle 13.

Before describing the detailed construction of the transmission mechanism, which is so designed as to entirely obviate the need for gearing, it is desired to note that the housing or casing of the transmission mechanism is constructed in two complementary halves joined on a central vertical plane. Two of the bolts 22 which serve to hold the halves of the transmission housing together, also pass through the rail portions 7 and thereby provide a simple manner of assembling the entire structure.

The transmission mechanism per se consists of a plurality of pawls 23 all mounted on the jack shaft 20 with their tips engaging a ratchet wheel 24 fixed to the axle. The pawls 23 are so mounted on the jack shaft that rotation of the jack shaft reciprocates the pawls to successively engage and advance the ratchet wheel 24. Each pawl has a round hole 25 in its large upper end and a hardened tip 26 shaped for proper engagement with the teeth of the ratchet wheel.

The round bearing holes of the pawls are preferably provided with bushings 27 and are journalled on eccentric discs 28 fitted onto the central part of the jack shaft which is polygonal in cross section. Interposed between each set of pawls and eccentric discs is a spacer 29, and the entire group of pawls with their spacers has a combined width equal to the space between thrust bearings 30 and 31 engaging the inner side walls of the transmission housing.

In the present instance there are six pawls, A, B, C, D, E and F, uniformly progressing in length from the longest (designated A) to the shortest (designated F), by a distance equal to one-sixth of the circular pitch of the ratchet wheel. The jack shaft is hexagonal in cross section, and the eccentric discs 28 have hexagonal holes 32 to fit the shaft. These holes are so located in the eccentric discs that when the discs are properly assembled on the jack shaft, their centers are equispaced about a circle concentric to the jack shaft axis. Hence, it will be seen that rotation of the jack shaft reciprocates the pawls in such a manner that three are active and moving downwardly while the other three are being retracted; and by virtue of their varying lengths each pawl advances the ratchet wheel a distance equal to one-third the circular pitch of the wheel. A substantial speed reduction and an exceedingly smooth application of power are thus obtained.

All of the pawls are yieldingly and independently urged toward the ratchet wheel by individual wire springs 33 hooked into the pawls with their free ends bearing against a transverse stud 34 grooved to receive the spring ends. Consequently, as long as they are unrestrained, the pawls are yieldingly maintained in driving engagement with the teeth of the ratchet wheel.

It will be seen that to disengage the driving connection between the engine and the traction wheels, it is only necessary to lift all of the pawls clear of the ratchet wheel teeth, and to this end a control device, indicated generally by the numeral 35, is provided. This device comprises a transverse shaft 36 journalled in the side walls of the transmission housing and having one end projecting outwardly therefrom to mount a lever 37. Welded or otherwise secured to the shaft 36 is an arm 38 shown in the present instance as a U-shaped plate embracing the shaft 36.

Slidably mounted in the outer end portion of the arm 38 are push pins 39, one for each pawl. One end of each pin has an enlarged head 40 against which a flat spring 41 fixed to the arm 38 bears to yieldingly urge the pin into engagement with the pawl, as clearly shown in Figure 4. The opposite ends of the pins are upset as at 42 to preclude disassembly of the pins from the arm 38.

With this construction, rotation of the shaft 36 in a counterclockwise direction, as viewed in Figure 4, causes the pins 39 to be engaged with the pawls to lift the same out of engagement with the teeth of the ratchet wheel, as shown in Figure 11, and through the provision of the individual springs 41, no pawl will be disengaged from the ratchet wheel while it is under load.

Upon return of the shaft 36 to its normal position, which is defined by the engagement of the arm 38 with a transverse stop pin 43, all the pawls will be allowed to engage the ratchet wheel to reestablish the driving connection between the drive shaft and the axle.

Oscillation of the shaft 36 to effect this engagement and disengagement of the driving connection is preferably obtained by rocking the lever 37 between predetermined definite positions by means of a shifter rod 45, the upper end of which slidably passes through a hole in the transverse brace 10, and has a handle knob 46 attached thereto to facilitate manual actuation thereof. The lower end of the rod 45 is yieldingly connected to the lever 37 by being slidably passed through a hole in an outstruck ear 47 extended from the lever 37 and normally held against movement therein by two opposed springs 48 and 49. The spring 48 is confined between a stop 50 fixed to the rod 45 upwardly from the ear 47, and the spring 49 is confined between the ear 47 and a nut 51 on the lower end of the rod.

To provide definite positions for the lever 37, a spring detent 52 is provided. This detent comprises a spring pressed plunger 53 mounted in a barrel 54 which may serve as the head of one of the bolts 22 by which the transmission casing is held together. The plunger 53 is yieldingly urged outwardly into engagement with the flat surface of the lever 37 to snap into one of two recesses 55 formed in the face of the lever and so located as to hold the shaft 36 in one or the other of its two positions.

From the foregoing description taken in connection with the accompanying drawings, it will be readily apparent to those skilled in the art that this invention eliminates the usual gear reduction from tractors of the type described, with its objectionable space and weight requirements and permits a lighter and smaller construction; that a smooth flow of power is provided and that the uni-directional character of the transmission permits the tractor to be pushed ahead at a speed faster than that at which the engine is driving it, which is often desirable as where the tractor is being taken out onto the field or brought back; and that the expense of a separate clutch mechanism is obviated.

What I claim as my invention is:

1. In a tractor of the character described: a pair of traction wheels; an axle for the wheels; an engine; means for transmitting power from the engine to the axle including speed reduction transmission mechanism; a housing for said transmission mechanism, said housing consisting of two complementary sections; means for securing said sections together; bearings carried by the housing sections for the axle; and a pair of elongated rails providing an engine support and handles for the tractor clamped to the opposite sides of the transmission housing by part of the means securing the housing sections together.

2. In a tractor of the character described: a pair of traction wheels; an axle to which the wheels are fixed; a transmission housing having the axle journalled therein; an engine mounted in juxtaposition to the transmission housing; power transmission means from the engine to the axle including a ratchet wheel fixed to the axle within the transmission housing; a plurality of pawls disposed within the transmission housing; means driven by the engine for reciprocating said pawls to successively engage the same with the teeth of the ratchet wheel; handles for the tractor connected with the transmission housing; and means operable from a point adjacent to the handles for controlling operative engagement of the pawls with the teeth of the ratchet wheel, said last named means including yieldable elements through which disengaging force is transmitted to the pawls so that disengagement of the pawls from the ratchet wheel is effected only when the pawls are freed from driving load.

3. In a tractor of the character described: a pair of traction wheels; an axle to which the wheels are fixed; a transmission housing having the axle journalled therein; an engine mounted in juxtaposition to the transmission housing; power transmission means from the engine to the axle including a ratchet wheel fixed to the axle within the transmission housing; a plurality of pawls disposed within the transmission housing; means driven by the engine for reciprocating said pawls to successively engage the same with the teeth of the ratchet wheel; handles for the tractor connected with the transmission housing; a shaft mounted in the transmission housing to turn on an axis parallel to the axle; spring members carried by said shaft to engage the pawls and yieldingly urge the same out of engagement with the teeth of the ratchet wheel upon oscillation of said shaft in one direction, said spring members applying a yielding force to the pawls when rendered operative so that the pawls are disengaged from the teeth of the ratchet wheel only when the pawls are freed from driving load; and an actuator connected with said shaft and extending to a point adjacent to the handles for imparting turning movement to said shaft.

PERRY E. MACK.